United States Patent Office 3,175,688
Patented Mar. 30, 1965

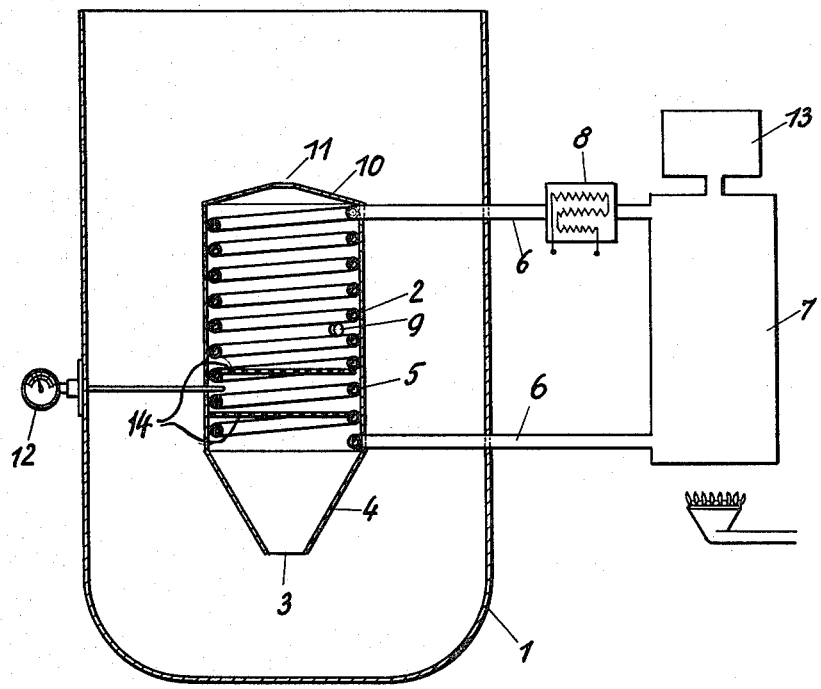

3,175,688
SEWAGE-TREATMENT PLANT FOR THE BIOLOGICAL PURIFICATION OF SEWAGE
Karl Zink, Stuttgart-Bad Cannstatt, Germany, assignor to Menzel & Co., Stuttgart-Bad Cannstatt, Germany, a firm
Filed Feb. 10, 1961, Ser. No. 88,367
3 Claims. (Cl. 210—149)

It is known in the art to accelerate the biological purification of sewage with the aid of anaerobic bacteria by pumping sludge after having settled into sludge-digestion towers where it is heated up to more than +30° C. to stimulate the increase and activity of the bacteria which effect, at a temperature from +27° C. upwards, the most vivid generation of methane and, consequently, the quickest purification.

It is also known to perform the digestion of sludge in large containers arranged separate from a sewage-treatment tank, the entire contents of the containers having to be brought to temperature conditions most favorable to the development of bacteria.

It is further known to effect the increase of bacteria in a breeding chamber which is immersed as a closed vessel in a water bath. In this case all of the water surrounding the breeding chamber is heated by means of a heating coil which is incorporated in a separate tank containing the water. From the breeding chamber, sludge enriched with bacteria is fed to a main sewage-treatment tank through a mixing conduit extending from the upper end of the breeding chamber.

The present invention now provides a sewage-treatment plant for the biological purification of sewage with the aid of anaerobic bacteria, which comprises a sewage-treatment tank, an immersion vessel disposed within said sewage-treatment tank and arranged to serve as a bacteria breeding chamber, openings provided at the bottom and the top and laterally of said immersion vessel, and a heating means arranged in the interior of said immersion vessel.

In this novel sewage-treatment plant, only a small quantity of the sewage to be purified and treated which corresponds substantially ot the volume of the immersion vessel, has to be brought to and maintained at a temperature most favorable to the conditions of life of the bacteria. Hence it follows that the energy necessary for heating is considerably reduced as compared to known plants. Furthermore, the increase of bacteria in situ, i.e. in the sewage-treatment tank itself, affords the advantage that large separate tanks, water baths, pumping of sludge enriched with bacteria and appertaining pumps, conduits and so on are dispensed with whereby the plant is substantially simplified. This has a very favorable effect upon the space required, the cost and the simple operation of the plant.

The direct passing over of the bacteria from the particularly favorable conditions prevailing in the immersion vessel to the less favorable conditions prevailing in the sewage-treatment tank is not critical since the bacteria have a property inherent in all living organisms, namely that they can be hindered from development by unfavorable conditions of life, but once they have developed, they remain alive even under less favorable conditions up to a certain term. Therefore, in the present case, the bacteria developed in the immersion vessel remain alive and fully active in the sewage-treatment tank.

A preferred embodiment of the invention will now be described by way of example and with reference to the accompanying drawing, in which the only figure is a diagrammatic cross-sectional view of a sewage-treatment plant according to the invention.

As shown in the figure, a sewage-treatment tank 1 which contains sewage to be purified and treated has a vessel 2 submerged therein and communicating with the sewage-treatment tank 1 through an opening 3 which is preferably located at the bottom end of a funnel-like constriction 4 of the vessel 2.

The immersion vessel 2 serves as a bacteria breeding vessel and contains in addition to nutritive substances for the bacteria which are introduced in any expedient manner, as for example on sieves or screens 14, a heat radiating means 5, preferably a heating coil, which is connected to a boiler 7 by means of conduits 6 suitably arranged and extending laterally or upwardly, and is supplied through one of said conduits 6 with warm water.

In the latter conduit a thermostat 8 is provided which keeps the small quantity of sewage contained in the vessel 2 and separated from the contents of the sewage-treatment tank 1 at a constant temperature of +30° C. At this temperature a vivid increase of the bacteria contained in the sewage of the vessel 2 takes place with the result that the bacteria will move through one or more apertures 9 provided in the wall of the immersion vessel 2 into the cooler water of the sewage-treatment tank 1 where they continue to live and act.

The immersion vessel 2 has at its top, preferably at the apex of a dome-shaped cap or cover 10, an opening 11 through which the gas generated by the bacteria in the vessel can escape as otherwise the bacteria would suffocate in their own gas.

The reference numeral 12 designates a distance thermometer for checking the temperature in the vessel 2. The boiler 7 is provided with an expansion tank 13 of known construction.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:
1. A sewage-treatment plant for biological purification of sewage with the aid of anaerobic bacteria, comprising a sewage-treatment tank for receiving sewage, an immersion vessel arranged to serve as a bacteria breeding chamber and adapted to operate at a predetermined level within said tank, said immersion vessel comprising an apertured inverted frusto-conical bottom providing open unrestricted communication with said tank to direct within the immersion vessel a small portion of the sewage, a dome-shaped cover having a vent opening adjacent its apex providing an outlet for gases generated by the bacteria within the vessel and a tubular portion located between the frusto-conical bottom and the dome-shaped cover, said tubular portion being apertured below the sewage level to provide passages through which the bacteria migrate to the sewage and thermostatically controlled heating means arranged in the interior of said immersion vessel.

2. A sewage treatment plant as in claim 1, wherein the heating means includes a conduit contacting the inner surface of the immersion vessel and means arranged exteriorly of the tank and in communication with said conduit for generating a heating medium to flow through the conduit.

3. A sewage treatment plant as in claim 1 wherein the bacteria growth is promoted by nutrient substances carried by support means located within the immersion vessel.

References Cited by the Examiner

UNITED STATES PATENTS

| | | | |
|---|---|---|---|
| 1,456,557 | 5/23 | Imhoff | 210—12 |
| 1,822,021 | 9/31 | Fuqua | 210—149 |
| 1,930,457 | 10/33 | Pruss | 210—12 |
| 2,188,847 | 1/40 | Streander | 210—14 |
| 2,638,444 | 5/53 | Kappe | 210—12 XR |

FOREIGN PATENTS 630,242  5/36  Germany.

REUBEN FRIEDMAN, *Primary Examiner.*

HARRY B. THORNTON, HERBERT L. MARTIN,
*Examiners.*